(12) United States Patent
Ellis et al.

(10) Patent No.: US 8,667,693 B2
(45) Date of Patent: Mar. 11, 2014

(54) FLANGE BOLT CUTTER

(75) Inventors: Shawn Ellis, Lafayette, LA (US);
Benjamin J. Snyder, Baton Rouge, LA (US); Rusty Richard, Lafayette, LA (US)

(73) Assignee: Greene's Energy Group, LLC, Houston, TX (US)

(*) Notice: Subject to any disclaimer, the term of this patent is extended or adjusted under 35 U.S.C. 154(b) by 456 days.

(21) Appl. No.: 12/898,036

(22) Filed: Oct. 5, 2010

(65) Prior Publication Data

US 2011/0113944 A1 May 19, 2011

Related U.S. Application Data

(60) Provisional application No. 61/249,243, filed on Oct. 6, 2009.

(51) Int. Cl.
*B23D 21/00* (2006.01)
(52) U.S. Cl.
USPC .................. 30/96; 30/92; 30/102; 83/743
(58) Field of Classification Search
USPC .............. 30/92–97, 101, 102; 83/743–745
See application file for complete search history.

(56) References Cited

U.S. PATENT DOCUMENTS

| | | | |
|---|---|---|---|
| 3,461,540 A | 8/1969 | Nelson et al. | |
| 3,704,516 A | 12/1972 | Ono | |
| 3,866,496 A * | 2/1975 | Payne et al. | 83/471.3 |
| 3,997,957 A | 12/1976 | Tone et al. | |
| 4,341,406 A * | 7/1982 | Abbes et al. | 285/408 |
| 4,402,136 A * | 9/1983 | Rast | 30/101 |
| 4,689,883 A | 9/1987 | Dent | |
| 4,939,964 A * | 7/1990 | Ricci | 82/113 |
| 5,081,768 A | 1/1992 | Brennan et al. | |
| 2007/0163392 A1 | 7/2007 | Kullmann et al. | |
| 2008/0010801 A1 | 1/2008 | Carson et al. | |

OTHER PUBLICATIONS

International Search Report in corresponding International Application No. PCT/US10/51439.
Written Opinion in corresponding International Application No. PCT/US10/51439.

* cited by examiner

*Primary Examiner* — Phong Nguyen
(74) *Attorney, Agent, or Firm* — Jones Walker LLP

(57) ABSTRACT

A flange bolt cutter for separating two connected flanges. The flange bolt cutter contains a circular saw blade pivotally connected to an adjustable flange band. The flange band contains an alignment ring for aligning the circular saw blade about the midpoint between two connected flanges. The flange bolt cutter is hydraulically operated. The adjustable flange band may be formed in two band sections hinged together and containing a rotatable bolt and handle for tightening and loosening the band sections around the flange connection.

9 Claims, 5 Drawing Sheets

FLANGE BOLT CUTTER

CROSS-REFERENCE TO RELATED APPLICATIONS

This application claims priority to Provisional Patent Application No. 61/249,243, filed on 6 Oct. 2009, which is incorporated herein by reference.

FIELD OF THE INVENTION

The present invention relates generally to an apparatus for cutting bolts, and more particularly, an apparatus for cutting flange bolts.

BACKGROUND OF THE INVENTION

Oil and natural gas platforms and installations have a limited life of operations. When oil runs out, the platforms and installations are decommissioned using a number of different alternatives. As examples, the platforms and installations may be (a) left completely or partially in the water (often called "reefing"); (b) removed and then reused in another location; or (c) hauled to shore for scrapping or recycling.

The majority of platform decommissioning in the world has occurred in the Gulf of Mexico. The process of decommissioning typically begins with well abandonment in which the well bores are filled with cement. The vertical pipes that carry the oil and gas are then removed. In the past, use of explosives was the most commonly used method for removing the vertical pipes. However, the use of explosives has become controversial because explosions, particularly underwater explosions, generate intense shock waves that cause instantaneous lethal impacts for marine life residing on or near the platform structure. As a result, non-explosive methods have become the preferred method of removing vertical pipes.

One of the problems encountered while using non-explosive methods to remove vertical pipes during decommissioning is that the vertical pipes usually have been exposed to the marine elements for several years, if not decades. This exposure typically causes excess rust to form on steel components of the vertical pipes, particularly around the flanges and flange bolts that are used to connect sections of vertical pipe. The excess rust can significantly delay the removal of vertical pipes because of the added difficulty in removing flange bolts. These delays can add to the costs of decommissioning, which have been estimated to be in the range of $15 million to $20 million for removal of a complete platform in shallow waters such as the Gulf of Mexico. These costs are typically borne by the lease operator, who is consistently searching for ways to reduce costs of decommissioning.

SUMMARY OF THE INVENTION

It is an object of the present invention to provide a means for reducing the costs of decommissioning abandoned oil and gas platforms by significantly decreasing the time it takes to remove rusted flange bolts from a vertical pipe.

These and other objects and advantages are achieved by the novel flange bolt cutter of the present invention. The flange bolt cutter may have a circular saw assembly including a circular saw blade, and a flange band assembly including an adjustable band having an outer surface and an inner surface. The circular saw assembly may be pivotally connected to the outer surface of the adjustable band. The adjustable band may be capable of detachable fixation around a midpoint between two flanges bolted together by a plurality of flange bolts. The inner surface of the adjustable band includes an alignment means capable of aligning the circular saw blade at the midpoint for cutting the plurality of flange bolts.

The circular saw assembly may include a motor for rotatably driving the circular saw blade. The motor is a hydraulically operated motor.

The circular saw assembly may include a blade case substantially covering an upper portion of the circular saw blade. The circular saw blade may have a serrated outer cutting edge. The serrated outer cutting edge may contain a carbon coating.

The circular saw assembly may include a mounting assembly for pivotal connection to the outer surface of the adjustable band. The mounting assembly may include a bracket pivotally connected to the outer surface of the adjustable band and one or more arms detachably connected to the bracket and to the blade case. The bracket and the blade case each may have two opposing sides. The mounting assembly may have two arms. One of the arms may be detachably connected to one of the opposing sides of the bracket and the blade case. The other arm may be detachably connected to the other opposing sides of the bracket and blade case. Each opposing side of the mounting bracket may include a cylinder guide affixed thereto. Each opposing side of the blade case may include one or more cylinder guides affixed thereto. The cylinder guides affixed to the bracket and the cylinder guides affixed to the blade case each may accommodate one of the arms.

The two arms may be adjustable about the cylinder guides affixed to the bracket and to the blade case. The cylinder guides affixed to the bracket and to the blade case each may contain at least one recess. The arms may contain a plurality of recesses. The arms may be adjustably connected to the cylinder guides by aligning one of the plurality of recesses in the arms with the at least one recess in each of the cylinder guides and extending a bolt from a plurality of bolts through each of the aligned recesses.

The adjustable band may comprise two band sections pivotally connected together by a hinge. The flange band assembly may include a detachable fixation means capable of detachably affixing the adjustable band about the midpoint of the two flanges. The detachable fixation means may include two adjusting nuts. One of the adjusting nuts may be affixed to one of the band sections. The other adjusting nut may be affixed to the other band section. An adjusting bolt may extend through each of the adjusting nuts. Rotation of the adjusting bolt in a first direction causes the nuts to move toward each other thereby tightening the band sections. Rotation of the adjusting bolt in a second direction causes the nuts to move away from each other thereby loosening the band sections. The adjusting bolt contains a handle for rotation thereof.

The two arms may contain a handle capable of being manipulated to lower the circular saw blade to a cutting position and to raise the circular saw blade to a non-cutting position.

The alignment means may include a raised ring projection capable of wedging into the midpoint between the two flanges. The raised ring projection may extend partially around the inner surface of the adjustable band. The adjustable band may have an opening for passage of the circular saw blade there-through to enable the circular saw blade to cut through one of the plurality of flange bolts. The raised ring projection may not extend into the opening.

These and many other objects and advantages will be readily apparent to one skilled in the art to which the invention pertains from a perusal of the claims and the following detailed description of the preferred embodiments and read in conjunction with the appended drawings.

DETAILED DESCRIPTION OF THE INVENTION

While the present invention will be described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the present invention not be limited to the particular embodiments disclosed as the best mode contemplated for carrying out this invention.

Figure 1:
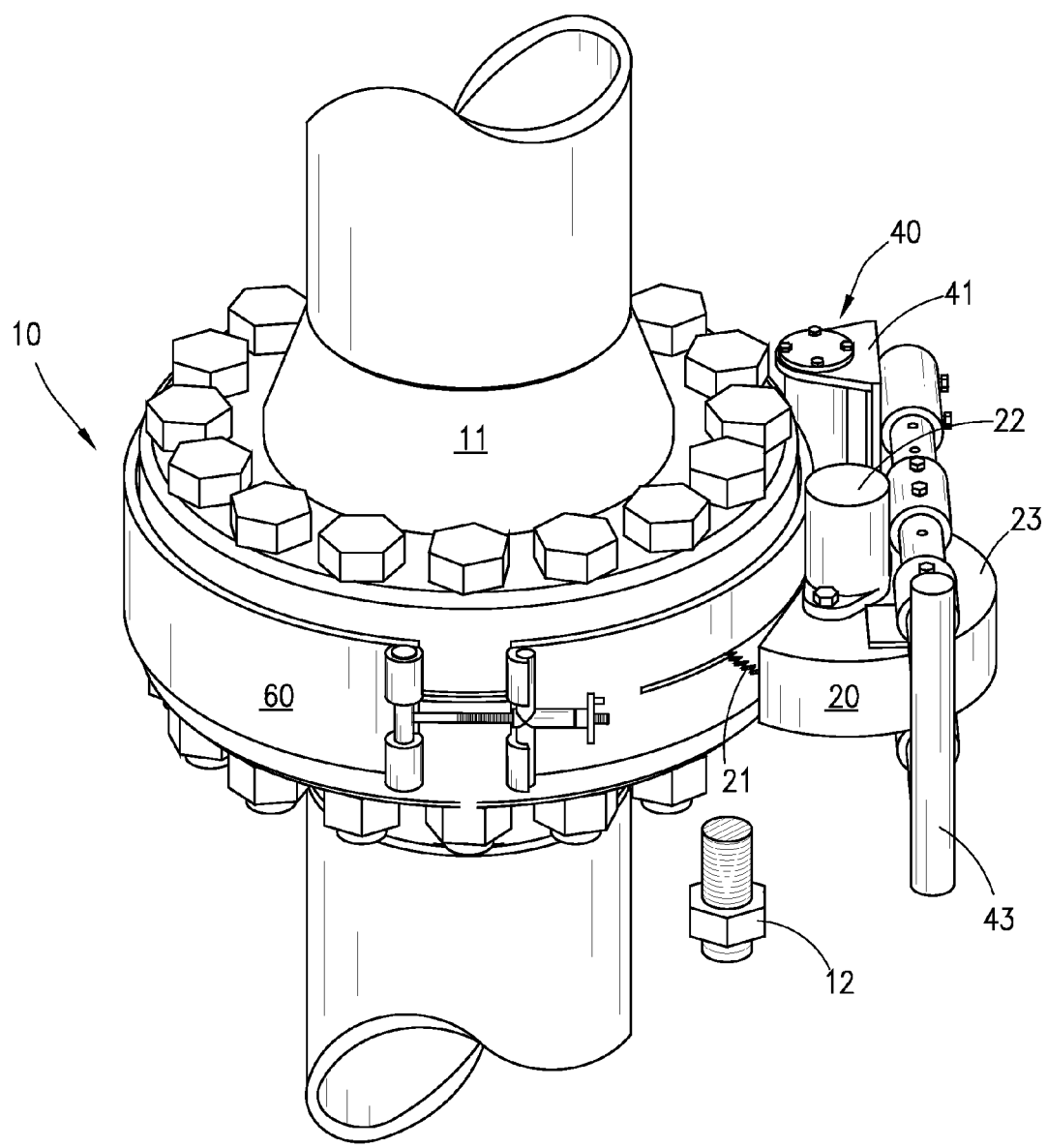
FIG. 1 is a side perspective view of an embodiment of the flange bolt cutter assembly of the present invention engaged on a flange.

FIG. 1 shows flange bolt cutter 10 operatively engaged about two flanges 11 that are secured together by flange bolts 12. Flange bolt cutter 10 includes a saw assembly 20, a pivot assembly 40, and a flange band assembly 60. Saw assembly 20 includes a circular saw blade 21, a motor 22 for rotatably driving said circular saw blade 21, and a blade case 23 for substantially covering the upper portion of said circular saw blade 21. Circular saw blade 21 is preferably equipped with carbide tips. Circular saw blade 21 is also preferably sufficiently thin to fit through typical gaps between flanges that are bolted together.

Figure 2:
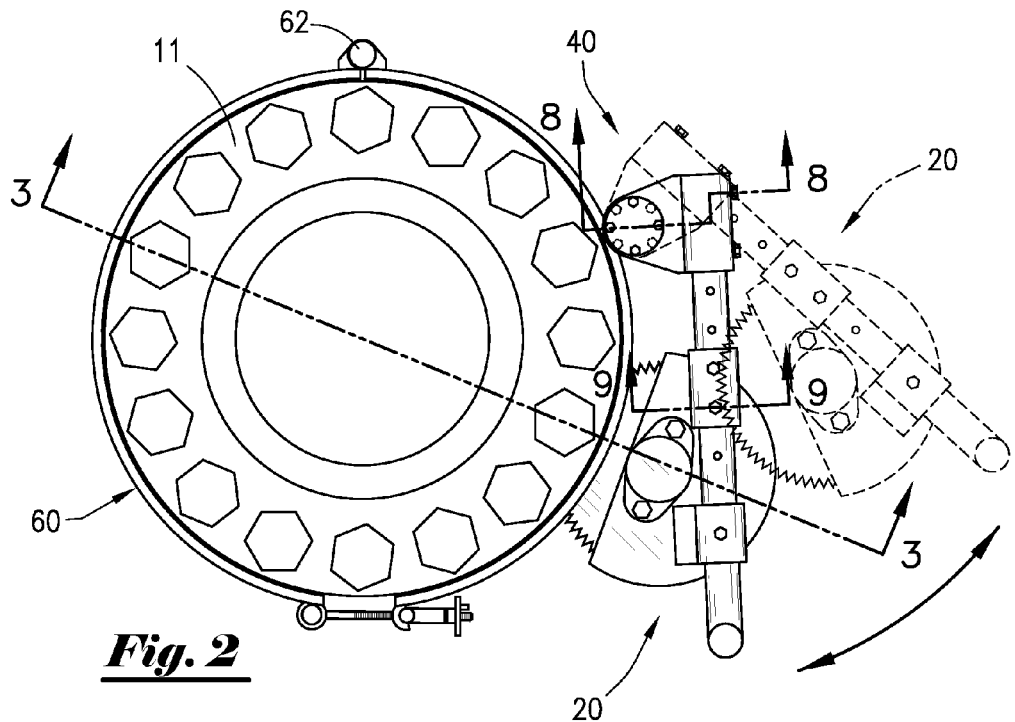
FIG. 2 is a top perspective view of the embodiment of the flange bolt cutter assembly shown in FIG. 1.
Figure 3:
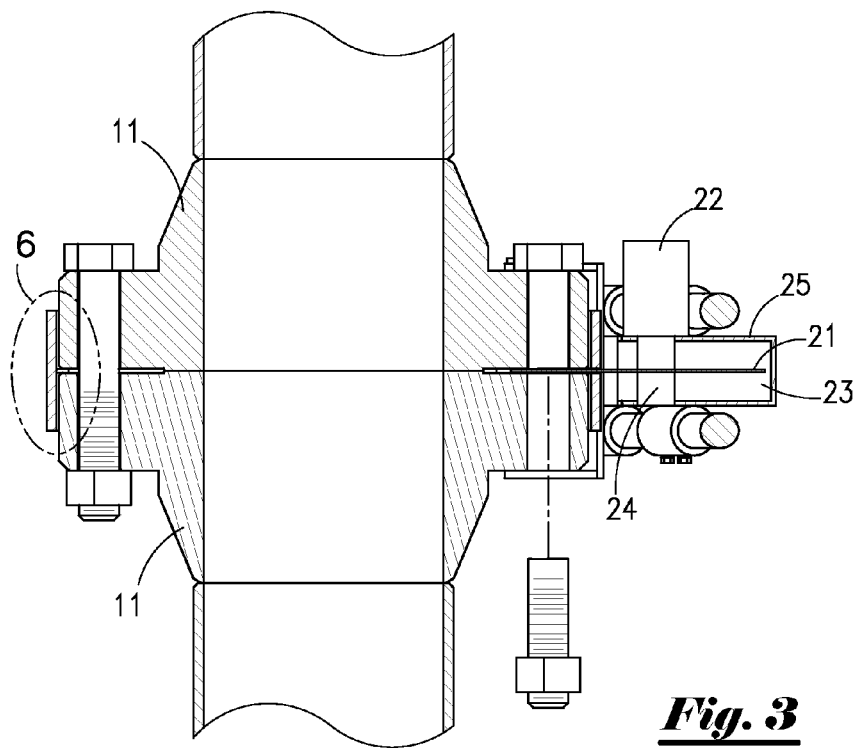
FIG. 3 is a cross-sectional view of the embodiment of the flange bolt cutter assembly shown in FIG. 2 taken along lines 3-3.

As seen in FIGS. 2 and 3, motor 22 is mounted to side wall 25 of blade case 23. Motor 22 is preferably, but not necessarily, powered by hydraulic fluid, which is typically transferred to and from motor 22 via hydraulic hoses (not shown). Blade case 23 supports saw shaft 24 extending through side wall 25 from motor 22. Circular blade saw 21 is detachably secured to saw shaft 24 on the end opposite motor 22.

Figure 4:
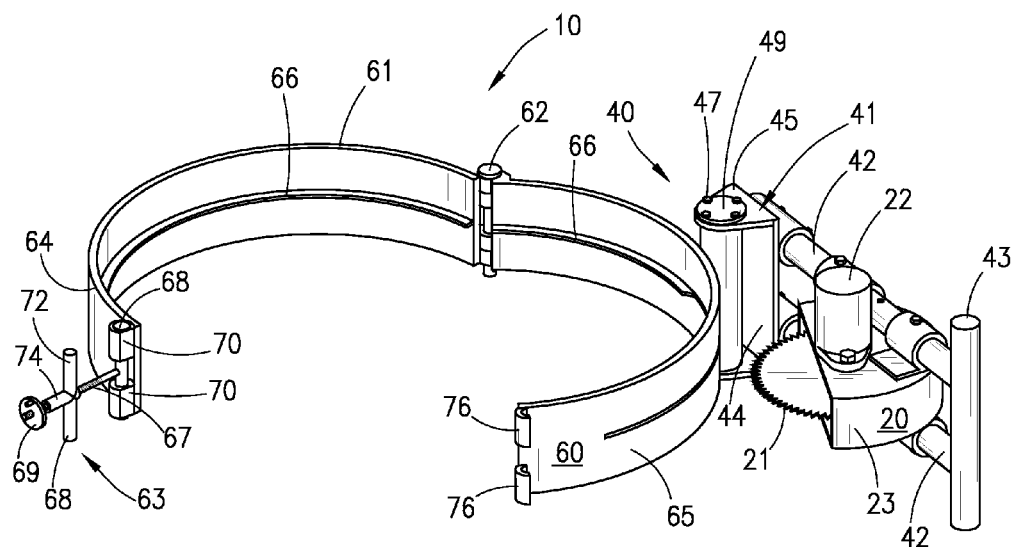
FIG. 4 is a partially exploded side perspective view of an embodiment of the flange bolt cutter assembly of the present invention shown with the flange band assembly in an open position.
Figure 5:
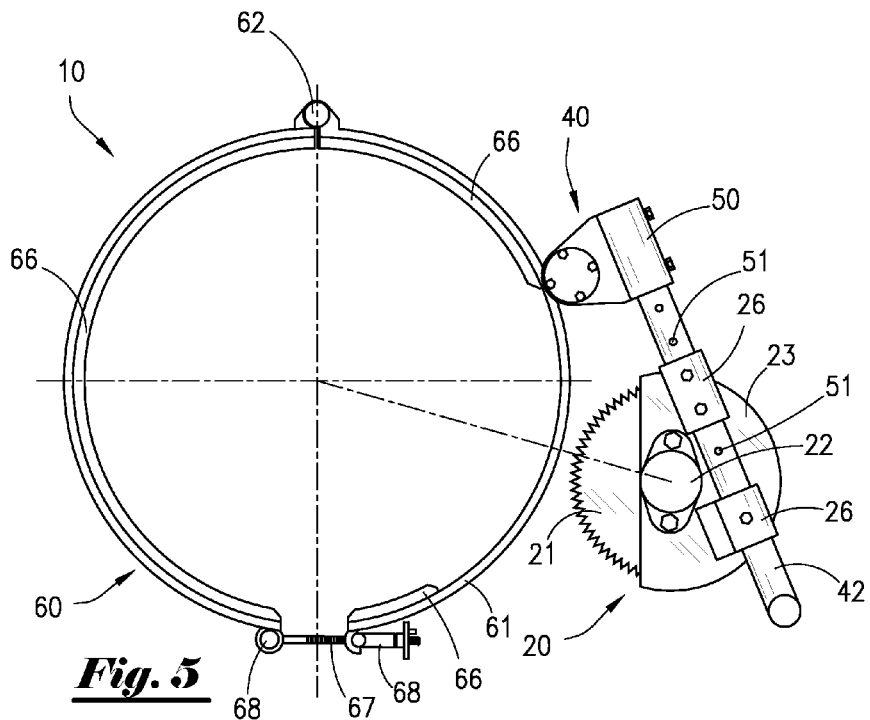
FIG. 5 is a top perspective view of the embodiment of the flange bolt cutter assembly shown in FIG. 4 but with the flange band assembly in a closed position.

With reference to FIGS. 4 and 5, blade case 23 is equipped with a set of cylinder guides 26 for accommodating pivot arms 42 of pivot assembly 40, as discussed below. Pivot assembly 40 preferably includes mounting bracket 41, pivot arms 42, and handle 43.

Figure 8:
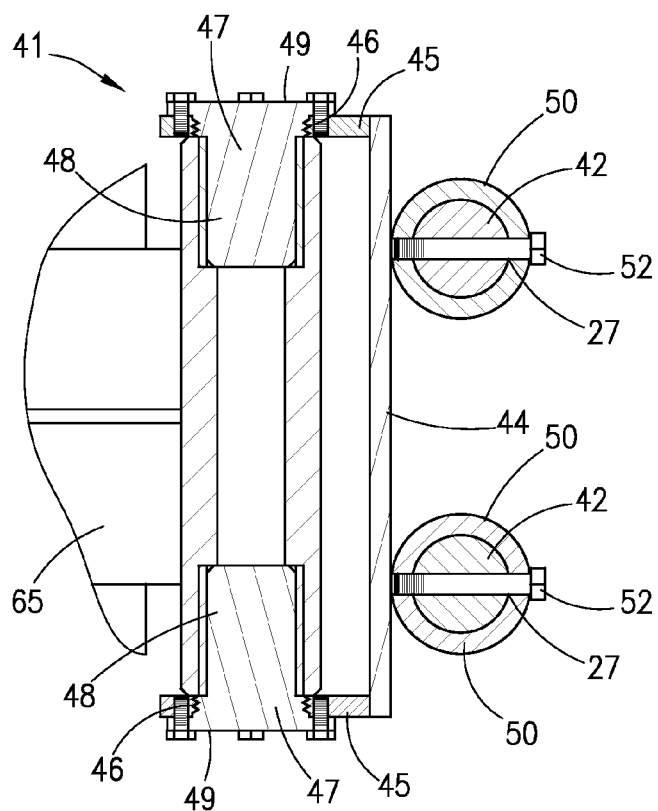
FIG. 8 is a cross-sectional view of the embodiment of a flange bolt cutter assembly of the present invention shown in FIG. 2 taken along lines 8-8.
Figure 9:
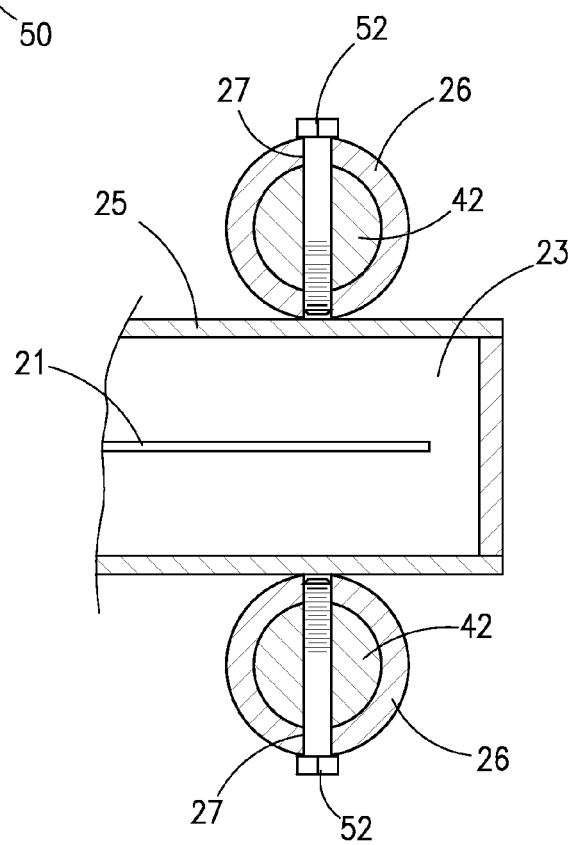
FIG. 9 is a cross-sectional view of the embodiment of a flange bolt cutter assembly of the present invention shown in FIG. 2 taken along lines 9-9.

As seen in FIGS. 4, 8 and 9, mounting bracket 41 has a base plate 44, side plates 45 on opposite sides of said base plate 44, and a set of cylinder guides 50 for accommodating pivot arms 42. Each side plate 45 is preferably equipped with a threaded hole 46 through which a threaded bolt 47 threadably fits therein. Each threaded bolt 47 preferably has a partially tapered end 48 on the end facing inwardly toward the other rotation plate 45, and a hex head end 49 on the end facing outwardly away from the other rotation plate 45. Partially tapered end 48 facilitates the insertion of threaded bolt 47 into a flange hole, while hex head end 49 facilitates the tightening and loosening of threaded bolt 47 onto side plate 45.

Figure 7:
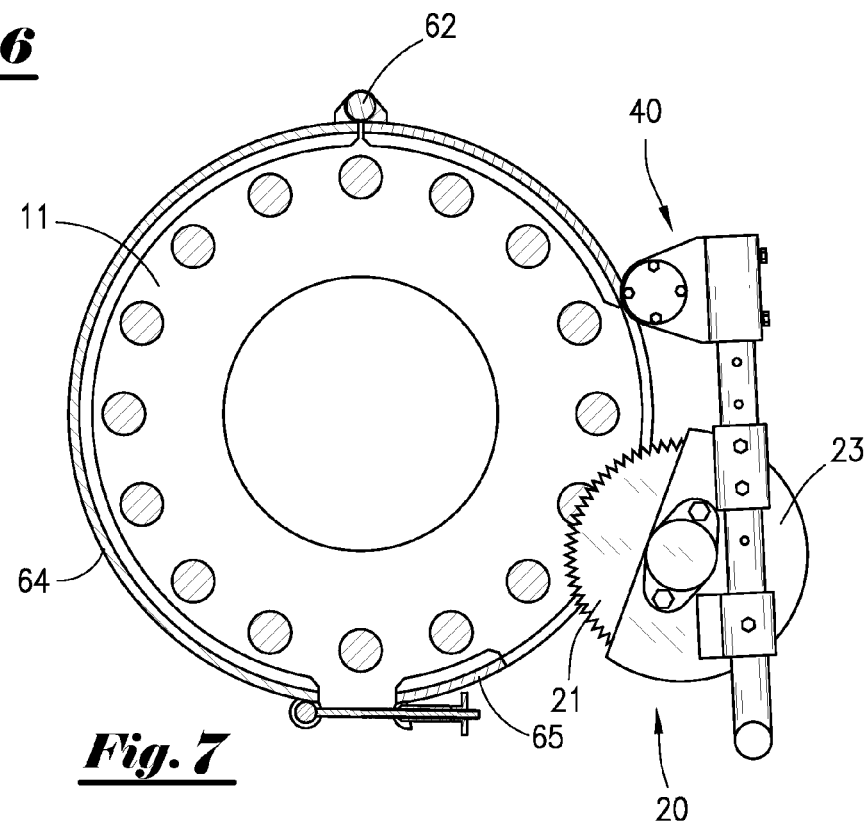
FIG. 7 is a partial cross-sectional top view of the embodiment of the flange bolt cutter assembly shown in FIG. 1 in cutting position.

Again with reference to FIGS. 4, 5, 8 and 9, pivot arms 42 adjustably extend through the set of cylinder guides 50 on mounting bracket 41 and the set of cylinder guides 26 on saw assembly 20. Pivot arms 42 are adjustable to allow optimum position of circular saw blade 21 with respect to the bolt 12 that is being cut during the cutting process. Pivot arms 42 have a series of bolt holes 51 that coincide with bolt holes 27 on cylinder guides 26 and 50, which when aligned at various positions, allow support bolts 52 to be inserted there-through for securing saw assembly 20 at a desired position. Pivot arms 42 are preferably equipped with a handle 43, which allows the user of bolt cutter 10 to raise and lower circular saw blade 21 between an upper, non-cutting position (as seen in FIG. 5) and a lower, cutting position (as seen in FIG. 7), and anywhere in between.

With references to FIGS. 4 and 5, flange band assembly 60 preferably includes a flange band 61, a hinge 62, and a flange band adjusting assembly 63. Flange band 61 is preferably constructed of two thin metal semi-circular pieces 64 and 65. The two semi-circular pieces are connected together at one end using hinge 62, and connected together at the other end using flange band adjusting assembly 63, as shown in FIGS. 1 and 2. Hinge 62 allows the user of bolt cutter 10 to open flange band 61 to facilitate installation and removal around flange 11. Flange band adjusting assembly 63, which preferably includes an adjusting bolt 67, at least two adjusting nuts 68, and an adjusting handle 69, allows the user to tighten flange band 61 around flange 11. Adjusting nuts 68 may be cylindrically shaped with one or more openings for receiving adjusting bolt 67. The one or more openings may be positioned on a side surface of each of adjusting nuts 68. One of adjusting nuts 68 may have an opening through its entire length for receiving adjusting bolt 67.

Again with reference to FIGS. 4 and 5, one of the adjusting nuts 68 is cylindrical with a central opening threadedly receiving one end of adjusting bolt 67. This adjusting nut 68 is pivotally connected to semi-circular piece 64 via spaced-apart closed receptacles 70. The other adjusting nut 68 has a first cylindrical section 72 and a second cylindrical section 74 positioned perpendicular thereto. Adjusting bolt 67 extends through section 74. Section 72 cooperates with spaced-apart open receptacles 76 affixed to semi-circular piece 65 when adjusting assembly 63 is tightened around flange 11. To tighten assembly 63, assembly 63 is pivoted into the tightening position so that section 72 aligns with receptacles 76. Adjusting handle 69, which is threadedly connected to adjusting bolt 67, is rotated so as to move adjusting nut 68 downward to position section 72 within receptacles 76 which in turn causes semi-circular pieces 64 and 65 to move together thereby fixedly attaching flange band assembly 60 to flange 11 in an operational position.

Figure 6:
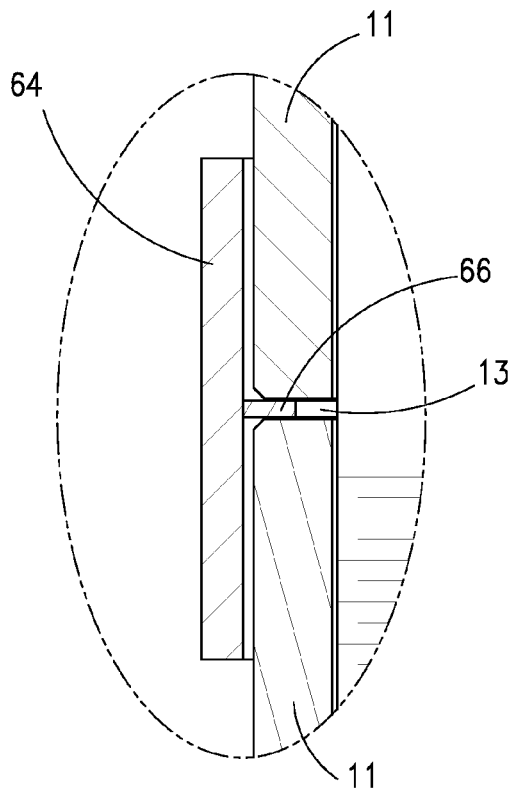
FIG. 6 is a partial cross-sectional view of the embodiment of the flange bolt cutter assembly of the present invention shown in FIG. 3 at 6.

FIGS. 4, 5 and 6 show that flange band 61 is equipped with a slot ring 66 along a portion of its surface. Slot ring 66 aligns flange band 61 and circular saw blade 21 with the midpoint 13 between flanges 11 where flange bolts 12 are being cut. Slot ring 66 is omitted from the flange band 61 between flange band adjusting assembly 63 and side plates 45 so as not to interfere with circular saw blade 21 during the cutting process.

Although this invention has been disclosed and described in its preferred forms with a certain degree of particularity, it is understood that the present disclosure of the preferred forms in only by way of example and that numerous changes in the details of construction and operation and in the combination and arrangement of parts may be resorted to without departing from the spirit and scope of the invention.

What is claimed is:

1. A flange bolt cutter comprising:
   a circular saw assembly including a circular saw blade, a blade case, and a mounting assembly;
   a flange band assembly including an adjustable band having an outer surface, an inner surface, and two band sections pivotally connected together by a hinge, the mounting assembly of the circular saw assembly pivotally connecting the blade case to said outer surface of the adjustable band; and
   wherein the adjustable band is configured for detachable fixation around a gap between two flanges bolted together by a plurality of flange bolts, and wherein the inner surface of the adjustable band includes an alignment means configured to align the circular saw blade at the gap for cutting the plurality of flange bolts, the alignment means comprising a raised ring projection extending partially around the inner surface of the adjustable band and configured for wedging into the gap between the two flanges, wherein the adjustable band has an opening for passage of the circular saw blade therethrough to enable the circular saw blade to cut through one of the plurality of flange bolts, the opening laterally aligned with the circular saw blade and the raised ring projection, and wherein said raised ring projection does not extend into the opening;
   wherein the mounting assembly of the circular saw assembly includes a bracket pivotally connected to the outer surface of the adjustable band and one or more arms detachably connected to the bracket and to the blade case, wherein the bracket and the blade case each has two opposing sides, wherein the mounting assembly has two arms, wherein one of the arms is detachably connected to one of the opposing sides of the bracket and the blade case and the other arm is detachably connected to the other opposing side of the bracket and blade case, wherein each opposing side of the bracket includes a cylinder guide affixed thereto, wherein each opposing side of the blade case includes one or more cylinder guides affixed thereto, and wherein the cylinder guides affixed to the bracket and the cylinder guides affixed to the blade case each accommodates one of the arms;
   wherein the flange band assembly further includes a detachable fixation means for detachably affixing the adjustable band about the gap between the two flanges, the detachable fixation means including two adjusting nuts, one of the adjusting nuts affixed to one of the band sections and the other adjusting nut affixed to the other band section, wherein an adjusting bolt extends through each of the adjusting nuts, wherein an adjusting handle attaches to said adjusting bolt, and wherein rotation of the adjusting handle in a first direction causes the adjusting nuts to move toward each other thereby tightening the band sections and rotation of the adjusting handle in a second direction causes the adjusting nuts to move away from each other thereby loosening the band sections.

2. The flange bolt cutter according to claim 1, wherein the circular saw assembly includes a motor for rotatably driving the circular saw blade.

3. The flange bolt cutter according to claim 2, wherein the motor is a hydraulically operated motor.

4. The flange bolt cutter according to claim 2, wherein the blade case substantially covers an upper portion of the circular saw blade.

5. The flange bolt cutter according to claim 4, wherein the circular saw blade has a serrated outer cutting edge.

6. The flange bolt cutter according to claim 5, wherein the serrated outer cutting edge contains a carbon coating.

7. The flange bolt cutter according to claim 1, wherein the two arms are adjustable about the cylinder guides affixed to the bracket and to the blade case.

8. The flange bolt cutter according to claim 7, wherein the cylinder guides affixed to the bracket and to the blade case each contains at least one recess, and wherein each of the arms contains a plurality of recesses, and wherein the arms are adjustably connected to the cylinder guides by aligning one of the plurality of recesses in the arms with the at least one recess in each of the cylinder guides and extending a bolt through each of the aligned recesses.

9. The flange bolt cutter according to claim 1, wherein the two arms contain a handle capable of being manipulated to lower the circular saw blade to a cutting position and to raise the circular saw blade to a non-cutting position.

* * * * *